United States Patent
Funaki

(10) Patent No.: US 6,707,471 B2
(45) Date of Patent: Mar. 16, 2004

(54) INFORMATION MANAGING APPARATUS AND DATA GENERATION METHOD AS WELL AS RECORD MEDIUM HAVING INFORMATION MANAGEMENT PROGRAM STORED THEREON

(75) Inventor: Isao Funaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/431,207

(22) Filed: Nov. 1, 1999

(65) Prior Publication Data

US 2003/0018651 A1 Jan. 23, 2003

(30) Foreign Application Priority Data

Mar. 12, 1999  (JP) .......................... 11-066133

(51) Int. Cl.⁷ ................................. G09G 5/00
(52) U.S. Cl. .................... 345/751; 707/2; 707/102; 345/808
(58) Field of Search ................. 707/104, 531, 707/102, 10; 705/8; 345/700, 762–763, 780, 751, 808

(56) References Cited

U.S. PATENT DOCUMENTS

| | | | | |
|---|---|---|---|---|
| 5,331,555 A | * | 7/1994 | Hashimoto et al. | 707/531 |
| 5,452,468 A | * | 9/1995 | Peterson | 345/419 |
| 5,548,506 A | * | 8/1996 | Srinivasan | 705/8 |
| 5,606,712 A | * | 2/1997 | Hidaka | 345/835 |
| 5,621,880 A | * | 4/1997 | Johnson | 345/783 |
| 5,742,778 A | * | 4/1998 | Hao et al. | 345/759 |
| 5,805,164 A | * | 9/1998 | Blum et al. | 345/780 |
| 5,899,979 A | * | 5/1999 | Miller et al. | 705/1 |
| 5,920,858 A | * | 7/1999 | Kitabayashi et al. | 707/4 |
| 6,006,212 A | * | 12/1999 | Schleich et al. | 705/412 |
| 6,098,028 A | * | 8/2000 | Zwan et al. | 702/120 |
| 6,300,948 B1 | * | 10/2001 | Geller et al. | 345/866 |
| 6,323,853 B1 | * | 11/2001 | Hedloy | 345/810 |
| 6,370,546 B1 | * | 4/2002 | Kondo | 707/10 |
| 6,374,304 B1 | * | 4/2002 | Chiashi | 709/246 |

FOREIGN PATENT DOCUMENTS

| | | |
|---|---|---|
| JP | 62-179015 | 8/1987 |
| JP | 07282129 | 10/1995 |
| JP | 09081295 | 3/1997 |

OTHER PUBLICATIONS

John L. Viescas, "Running Microsoft Acess 97", 1997, pp. 1–933.*

* cited by examiner

Primary Examiner—Jean R. Homere
Assistant Examiner—Mohammad Ali
(74) Attorney, Agent, or Firm—Staas & Halsey LLP

(57) ABSTRACT

An information managing apparatus having a plurality of different information management functions comprises a data selection unit for selecting data corresponding to each management function from data items entered, and a data generation unit for generating data for each management function using the thus selected data, wherein of data necessary for creation of information corresponding to the plurality of different management functions, common data are prepared as entry items so that when required data are entered, the data items are automatically selected for each of the management functions, after which data on each management function are generated.

10 Claims, 17 Drawing Sheets

F I G. 1
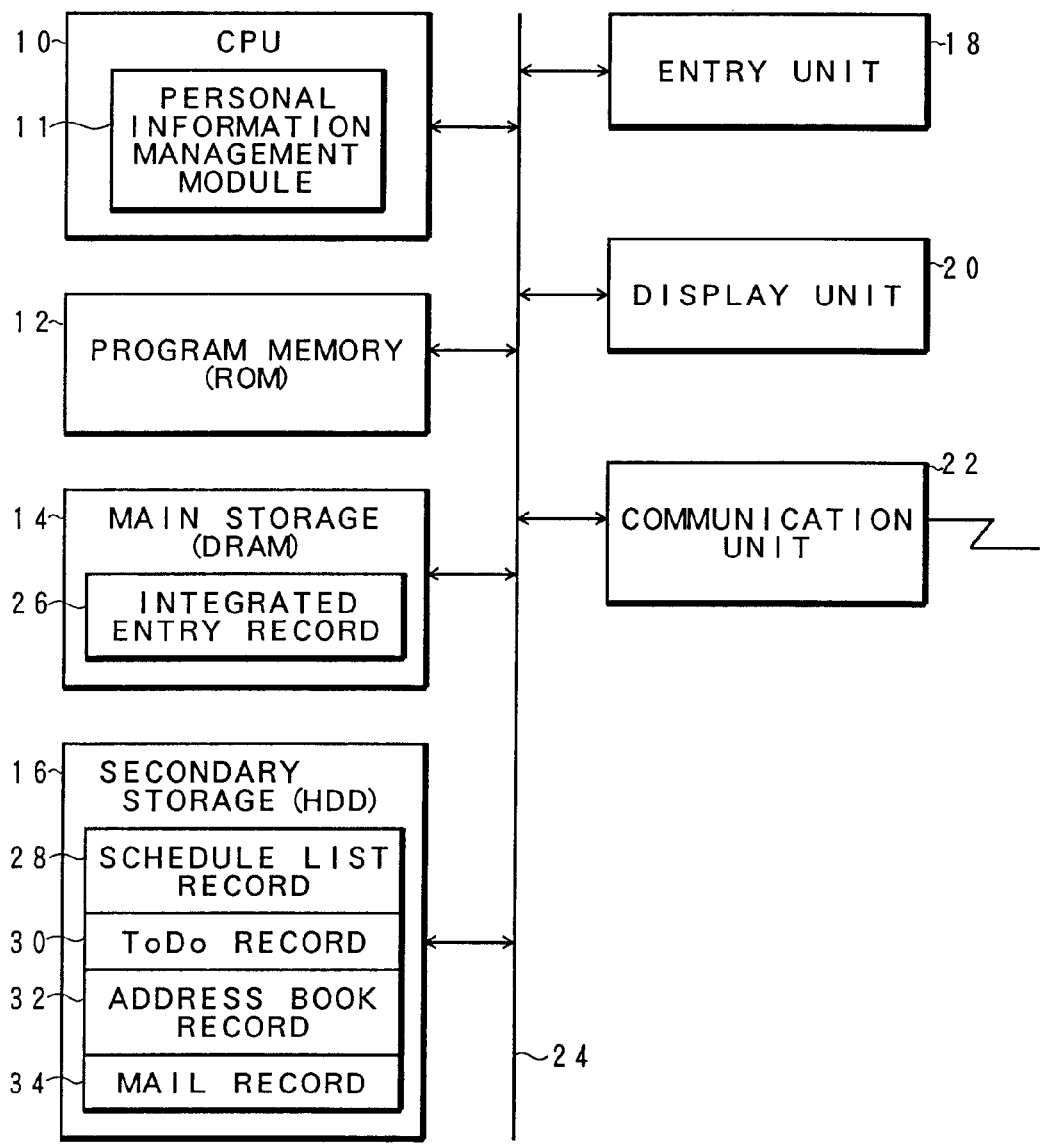

FIG. 4

| | | |
|---|---|---|
| 26-1 | \multicolumn{2}{c|}{ID0} |
| 26-2 | \multicolumn{2}{c|}{HEADER} |
| 26-3 | DATA ITEMS | STARTING DATE AND TIME |
| | | ENDING DATE AND TIME |
| | | SUBJECT |
| | | PLACE |
| | | CONTENTS |
| | | REQUESTER |
| | | REQUESTEE |
| | | PRIORITY |
| | | COLOR OF DISPLAY |
| | | TYPE OF WORK |
| 26-4 | TYPE INFORMATION | SCHEDULE |
| | | ToDo |
| | | ADDRESS BOOK |
| | | MAIL |

FIG. 11

INTEGRATED ENTRY — 50

- STARTING DATE AND TIME (B): 1999/01/26 ▲▼ 11:00 ▲▼ — 52
- ENDING DATE AND TIME (E): 1999/01/26 ▲▼ 12:00 ▲▼ — 54
- SUBJECT (T): BUSINESS PLAN REVIEW MEETING — 56
- PLACE (P): BUSINESS DIVISION CONFERENCE ROOM — 58
- CONTENTS (C): '99 BUSINESS PLAN REVIEW MEETING
  PREPARE TEN COPIES OF BUSINESS PLANNING DRAFT OF EACH DIVISION ON THAT DAY. — 60
- REQUESTER (L): MANAGER OF BUSINESS DIVISION — 62
- REQUESTEE (Q): CHIEF, SUZUKI; CHIEF, SATOH — 64
- COLOR OF DISPLAY (O): ▶ — 68
- PRIORITY (I): STANDARD ▶ — 66
- TYPE OF WORK (K): CREATION OF MATERIALS ▶ — 70

TYPE OF INFORMATION TO BE CREATED
☑ SCHEDULE   ☑ ToDo   ☑ ADDRESS BOOK   ☑ MAIL
   72           74          76               78

[ OK ] — 80     [ CANCEL ] — 82

FIG.12A

NEW CREATION OF SCHEDULE

| SCHEDULE | ALARM | MEMO OF RESULT | ARBITRARY ITEMS | RELATIONAL FILES |

SUBJECT (T): BUSINESS PLAN REVIEW MEETING — 86

PLACE (P): BUSINESS DIVISION REFERENCE ROOM — 88

CONTENTS (C):
'99 BUSINESS PLAN REVIEW MEETING
PREPARE TEN COPIES OF BUSINESS PLANNING DRAFT
OF EACH DIVISION ON THAT DAY. — 90

START/END
☑ SET START/END (A)
STARTING DATE AND TIME (B): 1999/01/26 ▶  11:00 ▶
ENDING DATE AND TIME (E): 1999/01/26 ▶  12:00 ▶
☐ ALL DAY (D)

CLASSIFICATION (S): [          ]  SET (E)
REQUESTER (L): MANAGER OF BUSINESS DIVISION
REQUESTEE (Q): CHIEF,SUZUKI;CHIEF,SATOH ▶
PRIORITY (I): STANDARD ▶    ☐ EVENT (V)
COLOR OF DISPLAY (O): [      ] ▶    ☐ SECRET (R)

[OK]  [CANCEL]

FIG. 13

118 — NEW CREATION OF ToDo

| STANDARD DETAILS | ALARM | ARBITRARY ITEMS | RELATIONAL FILES |

SUBJECT (M): CREATION OF MATERIALS FOR BUSINESS PLAN REVIEW MEETING ▼ — 120  MATTER (B)

CONTENTS (C): '99 BUSINESS PLAN REVIEW MEETING
PREPARE TEN COPIES OF BUSINESS PLANNING DRAFT
OF EACH DIVISION ON THAT DAY. — 122

124 — PERIOD
☑ SET PERIOD (L) — 126
STARTING DATE (G): 1999/01/14 ▼
SCHEDULED ENDING DATE AND TIME (E): 1999/01/25 ▼ — 128    17:00 ▼ — 130

131 — ☐ WHEN EXPIRED, REGARD AS PASSING OF TIME LIMIT (O)

132 — OK        CANCEL — 134

NEW PREPARATION OF ToDo

| STANDARD | DETAILS | ALARM | ARBITRARY ITEMS | RELATIONAL FILES |

─ REQUEST ─ 138

REQUESTER (L): | MANAGER OF BUSINESS DIVISION |

REQUESTEE (Q): | CHIEF, SUZUKI ; CHIEF, SATOH | 140

─ PROGRESS ─ 144

STATE OF PROGRESS (O): | UNSTARTED ▶ |     DATE AND TIME OF COMPLETION (F): | NONE ▶ |

142

PRIORITY (I): | STANDARD ▶ |
146

COLOR OF CARD (S): | ▶ |
148

CLASSIFICATION (C): | |    | SET (E) |
150

☐ SECRET (R)
152

| OK | | CANCEL |
154        156

FIG.15A

NEW CREATION OF ADDRESS BOOK DATA

TITLE (T): CHIEF,SUZUKI

| PERSONAL INFORMATION | HOME | OFFICE | PARENTS' HOME | FAMILY | MEMO |

READING OF FAMILY NAME IN kana (G): 166

FAMILY NAME (L): SUZUKI   172   READING OF FIRST NAME IN kana (A):

176   FIRST NAME (F):

NICKNAME (N):

SEX (X):   180

CLASSIFICATION (C):   ▶   BLOOD TYPE (O):   ▶

COLOR OF CARD (S):   ▶   186

☐ DATE OF BIRTH (I)   184

CALENDAR YEAR   ▲▼ 1999 YEAR   1   ▲▼ MONTH   26   ▲▼ YEAR

TWELVE CONSTELLATIONS   WATER BEARER

THIRTEEN CONSTELLATIONS   HORNED GOAT

162 ARBITRARY ITEMS | RELATIONAL FILES | ASSOCIATION DATA
164 DATE OF UPDATING
170
MIDDLE NAME (M):
176
HONORIFIC TITLE (H):
178 ☐ SECRET (R)
SET (E)
182

TUESDAY | 0 | YEARS OLD
TEN CALENDAR SIGNS | tsuchinoto
TWELVE ANIMAL SIGNS | RABBIT

210 OK    212 CANCEL

FIG. 16

[SENDING OF MAIL] 214

MAIL (M)　EDIT (E)　DISPLAY (V)　FORMAT (O)　SETTING (S)　TOOL (L)　HELP (H)

SENDER (A)　▶ ISAO Funaki　216　SIGNATURE (G)　COMPANY ▶ 218　INSERT (I) 220

CAPTION (U)　BUSINESS PLAN REVIEW MEETING 222

ADDRESSEE (T)　CHIEF,SUZUKI; CHIEF,SATOH 224

CC (C) 226

BCC (B)

ATTACHED FILE (F)　0 228　SIGNIFICANCE (P)　ORDINARY ▶ 230

```
F---+----1----+----2----+----3----+----4----+----5----+----6----+----7---  232
CHIEF,SUZUKI; CHIEF,SATOH↓
↓
DATE AND TIME :FROM 11:00 1/26/1999 TO 12:00 1/26/1999↓
SUBJECT      :BUSINESS PLAN REVIEW MEETING↓
PLACE        :BUSINESS DIVISION CONFERENCE ROOM↓
CONTENTS     :'99BUSINESS PLAN REVIEW MEETING. PREPARE TEN COPIES OF
              BUSINESS PLANNING DRAFT OF EACH DIVISION ON THAT DAY.↓
↓
Funaki ISAO↓
-----------------------------------------------------
Tel:0000-00-0000/Ext:XXXX-XXXX/Fax:YYYY-YY-YYYY (ZZZZ-ZZZZ)↓
e_mail:funaki@f.co.jp↓
[EOF]
```

INFORMATION MANAGING APPARATUS AND DATA GENERATION METHOD AS WELL AS RECORD MEDIUM HAVING INFORMATION MANAGEMENT PROGRAM STORED THEREON

BACKGROUND OF THE INVENTION

1. Field of the Invention

The present invention relates generally to an information managing apparatus for creating and managing a plurality of different personal information such as a schedule list, ToDo, address book, mail, etc., and to a data generation method as well as a computer readable record medium on which is stored an information management program. More particularly, it relates to an information managing apparatus ensuring an integrated entry of data items necessary for the creation and management of the plurality of different personal information, and to a data generation method as well as a record medium having a thereon stored information managing program.

2. Description of the Related Arts

Information processing equipment for personal use such as portable remote terminals, personal computers, etc., has hitherto employed a personal information management system known as PIM (Personal Information Manager) or PDA (Personal Data Assistant). Such a personal information management system has built-in functions for personal information management including a schedule list management for creating and managing schedule lists, a ToDo management for setting and managing what to do for what purposes as in e.g., creation of transactions, and an address book management for creating and managing address books. Furthermore, due to recently indispensable exchange of electronic mails, some personal information management systems have an additional mail management function for managing creation, sending and reception of electronic mails. Some systems for supporting operations by plural persons, which may be called groupware, also have such a plurality of management functions.

By the way, in the cases where a plurality of different management functions for the schedule list management, ToDo management, address book management, mail management, etc., have been incorporated into the information management system, there is a need to enter data necessary for the creation of management information on a management function basis while switching the management functions. When holding a meeting for example, the schedule list management function is used to enter data required for creation of the meeting schedule list, the ToDo management function is used to enter data required for creation of transactions and setting of the schedule, and the mail management function is used to enter data items necessary for creation of memos to be distributed to attendants at the meeting or creation of call-up letters in the form of mails. This means that in order to hold the same meeting, same data must separately be entered, on a management function basis, through the schedule list management function, the ToDo management function, and mail management function, respectively. Thus, in case of increased number of types of the management functions, data entry operations may often become cumbersome and be liable to err.

SUMMARY OF THE INVENTION

According to the present invention there are provided an information managing apparatus and data creation method as well as a record medium having an information management program stored thereon, ensuring a simple entry operation of data for a plurality of different information management functions to achieve an easy creation of information without any inconsistency in the contents of entry data among respective management functions.

The information managing apparatus of the present invention has a plurality of different information management functions and comprises a data selection unit for selecting data items corresponding to each of the management functions from entry data; and a data generation unit for generating data for each of the management functions using the data items thus selected. According to such an information managing apparatus of the present invention, in cases where creation of a plurality of different information such as schedule list, ToDo, mail, etc., is required for one event as in e.g., holding a meeting, it will become unnecessary to perform individual entry on a management function basis while switching to each management function for data entry, thereby ensuring a simple creation of information without any inconsistency, to achieve a highly convenient information management and operations. The information managing apparatus of the present invention further comprises an entry screen display control unit for displaying on a display screen a single entry screen for the entry of the data. The information managing apparatus of the present invention further comprises a management function selection unit for selecting a desired management function generating the data. In the information managing apparatus of the present invention, the entry data include a plurality of items, and the data selection unit selects items related to each of the management functions. The data selection unit selects items related to each management function from the entry data on the basis of correspondence information (data item correspondence list) previously defining each management function and items to be selected therefor. The data generation unit generates data for the management functions in which each of the selected data is allocated to each data element. Furthermore, the data generation unit generates one data element of data for the management functions by use of the selected plurality of data.

The present invention further provides a data generation method for generating respective data for a plurality of different information management functions, the method comprising an entry step for entering data; a selection step for selecting data corresponding to each of the management functions from the entry data; and a generation step for generating data for each of the management functions by use of the selected data. This data generation method further comprises a display step for displaying on a display screen a single entry screen for the entry of the data. It further a function selection step for selecting a desired management function generating the data. The entry data include a plurality of items, and the data selection step comprises selecting items related to each of the management functions. The selection step comprises selecting items related to each management function from the entry data on the basis of correspondence information previously defining each management function and items to be selected therefor. The generation step comprises generating data for the management functions in which each of data selected in the selection step is allocated to each data element. The generation step comprises generating one data element of data for the management functions by use of the plurality of data selected in the selection step.

The present invention further provides a computer readable record medium in which is stored an information management program for causing a computer to perform an entry step for entering data; a selection step for selecting data corresponding to each of management functions from the entry data; and a generation step for generating data for each of the management functions by use of the selected data. In this case there is stored the program for causing the computer to further perform a display step for displaying on a display screen a single entry screen for the entry of the data. There is also stored the program for causing the computer to further perform a function selection step for selecting a desired management function generating the data. The entry data include a plurality of items, and the data selection step comprises selecting items related to each of the management functions. The selection step comprises selecting items related to each management function from the entry data on the basis of correspondence information previously defining each management function and items to be selected therefor. The generation step comprises generating data for the management functions in which each of data selected in the selection step is allocated to each data element. The generation step comprises generating one data element of data for the management functions by use of the plurality of data selected in the selection step.

The above and other objects, aspects, features and advantages of the present invention will become more apparent from the following detailed description with reference to the accompanying drawings.

BRIEF DESCRIPTION OF THE DRAWINGS

FIG. 1 is a block diagram of an example of the hardware configuration of the present invention;

FIG. 4 is an explanatory diagram of an integrated entry record of FIG. 2;

FIG. 11 is an explanatory diagram of an integrated entry screen corresponding to FIG. 4;

FIGS. 12A and 12B are explanatory diagrams of a schedule list creation screen corresponding to FIG. 5;

FIG. 13 is an explanatory diagram of a ToDo creation screen corresponding to FIG. 6;

FIG. 14 is an explanatory diagram of the ToDo creation screen corresponding to FIG. 7;

FIG. 15A and 15B are diagrams of the address book creation screen corresponding to FIG. 8; and FIG. 16 is an explanatory diagram of a mail sending screen corresponding to FIG. 9.

DETAILED DESCRIPTION OF THE PREFERRED EMBODIMENTS

Figure 2:
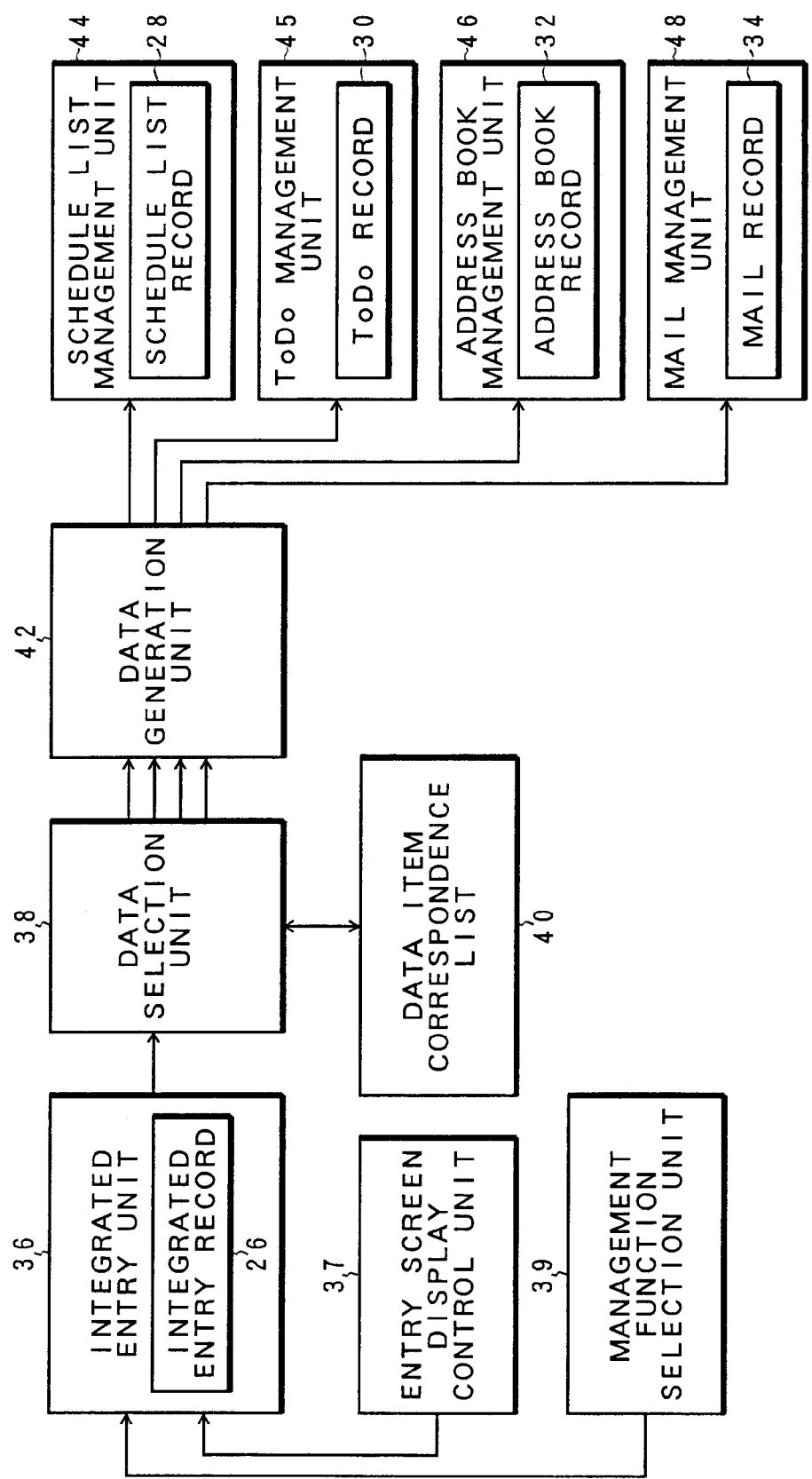
FIG. 2 is a function block diagram of the present invention.

FIG. 1 illustrates an example of the hardware configuration of a personal information managing apparatus in accordance with the present invention. The apparatus comprises a CPU 10, a program memory 12 in the form of a ROM, a main storage 14 in the form of a DRAM or the like, a secondary storage 16 using a hard disk drive (HDD), an entry unit 18 using a keyboard, a mouse, a touch pen tablet or the like, and a communication unit 22 for communication with the exterior by means of, e.g., electronic mails. Such a personal information managing apparatus to which the present invention is applied can include appropriate information equipment such as portable information terminals or personal computers. The CPU 10 comprises a personal information management module 11 for information management processing of the present invention implemented by the program control. The personal information management module 11 is implemented by an application program provided in the form of, PIM or PDA, for example. The personal information management module 11 provided by the present invention supports four personal management functions, that is, a schedule list management function, a ToDo management function, an address book management function and a mail management function. Furthermore, integrated entry function is provided for the entry of data items when creating personal information to be managed by the four personal management functions, whereupon automatic entry function is provided to select, from integratedly entered data items, items required for each of the schedule list management function, the ToDo management function, the address book management function and the mail management function and to automatically record the thus selected items into corresponding management records. In addition to the four different information management functions managed by this personal information management module 11, that is, the schedule list management function, the ToDo management function, the address book management function and the mail management function, the main storage 14 retains an integrated entry record 26 for allowing integrated entry of the data items for the four information management functions. The secondary storage 16 retains a schedule list record 28, a ToDo record 30, an address book record 32 and a mail record 34.

FIG. 2 is a function block diagram of the information managing apparatus of the present invention implemented by the personal information management module 11 of FIG. 1. The personal information managing apparatus is constituted by an integrated entry unit 36, a data selection unit 38, a data item correspondence list 40 and a data generation unit 42, and further comprises, as information management functions with which data are to be created by the integrated entry of the data items of the present invention, a schedule list management unit 44, a ToDo management unit 45, an address book management unit 46 and a mail management unit 48. Furthermore, the integrated entry unit 36 is associated with an entry screen display control unit 37 and a management function selection unit 39. The integrated entry unit 36 is provided with the integrated entry record 26 for use in the entry of data items necessary for the creation of personal information. The schedule list management unit 44 is provided with the schedule list record 28, the ToDo management unit 45 is provided with the ToDo record 30, the address book management unit 46 is provided with the address book record 32, and the mail management unit 48 is provided with the mail record 34. These records are virtually retained in the secondary storage 16 as in FIG. 1 and are read out to the main storage 14 if needed, to allow the personal information management module 11 to effect the entry and creation. The integrated entry unit 36 enters in an integrated manner data items for use in the four different information management units, that is, the schedule list management, ToDo management, address book management and mail management units. The entry screen display control unit 37 serves to display on a display screen a single entry screen for the entry of data by the integrated entry unit 36. The management function selection unit 39 selects a desired management unit (management function) for creating data on the basis of entry by the integrated entry unit 36. These data items entered by the integrated entry unit 36 are recorded in the form of the integrated entry record 26. In this embodiment, the data items enterable by the integrated entry unit 36 can include for example ten items, that is, starting date and time, ending date and time, subject, place, contents, requester, requestee, priority, color of display, and type of work. From the data items entered by the integrated entry unit 36, the data selection unit 38 selects data items for creating data in connection with each management function for each of four different information management units, that is, the schedule list management unit 44, the ToDo management unit 45, the address book management unit 46 and the mail management unit 48. The data item correspondence list 40 is referred to in order to select data for four different information management units of the thus entered data items.

Figure 3:
FIG. 3 is an explanatory diagram of a data item correspondence list for use in FIG. 2.

FIG. 3 is an explanatory diagram of the data item correspondence list 40 of FIG. 2. This data item correspondence list 40 includes, as elements representative of data items registered in advance, ten items, that is, starting date and time, ending date and time, subject, place, contents, requester, requestee, priority, color of display and type of work. The data item correspondence list 40 defines, as the information management unit for data generation, four management functions, that is, schedule list, ToDo, address book and mail management functions in a manner corresponding to each data item element. These four management functions are specified by ID codes, that is, ID1, ID2, ID3 and ID4, which have previously been set for the respective management functions, and are allocated to the information management units having the corresponding ID codes, with linkage of data item elements to the ID codes indicative of each management information. Herein, for the schedule list management unit 44, the data item correspondence list 40 includes, as data items correlated thereto, nine items, that is, starting date and time, ending date and time, subject, place, contents, requester, requestee, priority and color of display. For the ToDo management unit 45, it includes as data items correlated thereto, nine items, that is, starting date and time, subject, place, contents, requester, requestee, priority, color of display and type of work. For the address book management unit 46, it includes as data items correlated thereto, two items, that is, requester and requestee. Furthermore, for the mail management unit 48, it includes as data items correlated thereto, six items, that is, starting date and time, ending date and time, subject, place, contents and requestee. Naturally, the data item correspondence list 40 of FIG. 4 is shown merely by way of example and could include any additional or modified data item elements other than the above if needed.

Referring again to FIG. 2, the data generation unit 42 automatically enters into correspondence information management units, data items selected for each of the four different information management units through the reference to the data item correspondence list 40 by the data selection unit 38, and records them into their respective records. Through this recording of data items integratedly entered by the data generation unit 42, into the record of each information management unit, automatic generation or updating of management information is carried out in each information management unit. The four different information management units of FIG. 2 perform the following processing. The schedule list management unit 44 creates and manages schedules in connection with businesses such as holding of a meeting. The ToDo management unit 45 sets, e.g., the state of progress of preparations for transactions or of request for a business, and creates and manages so-called ToDo information including setting of what to do for what purpose. The address book management unit 46 creates and manages an address book including various personal attribute information in addition to full name, date of birth and mail address. Furthermore, the mail management unit 34 performs creation, sending and reception of electronic mails and manages the thus created or received mails.

FIG. 4 is an explanatory diagram of the integrated entry record 26 being stored in the integrated entry unit 36 of FIG. 2. The integrated entry record 26 includes an ID field 26-1 for storing ID0 indicative of being an integrated entry record, which is followed by a header field 26-2 for storing header information. The header information defines the data length of the integrated entry record 26 as well as the content and construction of the data section. The header field 26-2 is followed by an entry data item field 26-3 and then by a type information field 26-4 for setting the type of personal management function into which entry data items are entered. In this example, the entry data item field 26-3 allows entry of ten items, that is, starting date and time, ending date and time, subject, place, contents, requester, requestee, priority, color of display and type of work. The type information field 26-4 includes four type information setting regions for schedule, ToDo, address book and mail corresponding respectively to the schedule list management unit 44, the ToDo management unit 45, the address book management unit 46 and the mail management unit 48 of FIG. 2.

Figure 5:
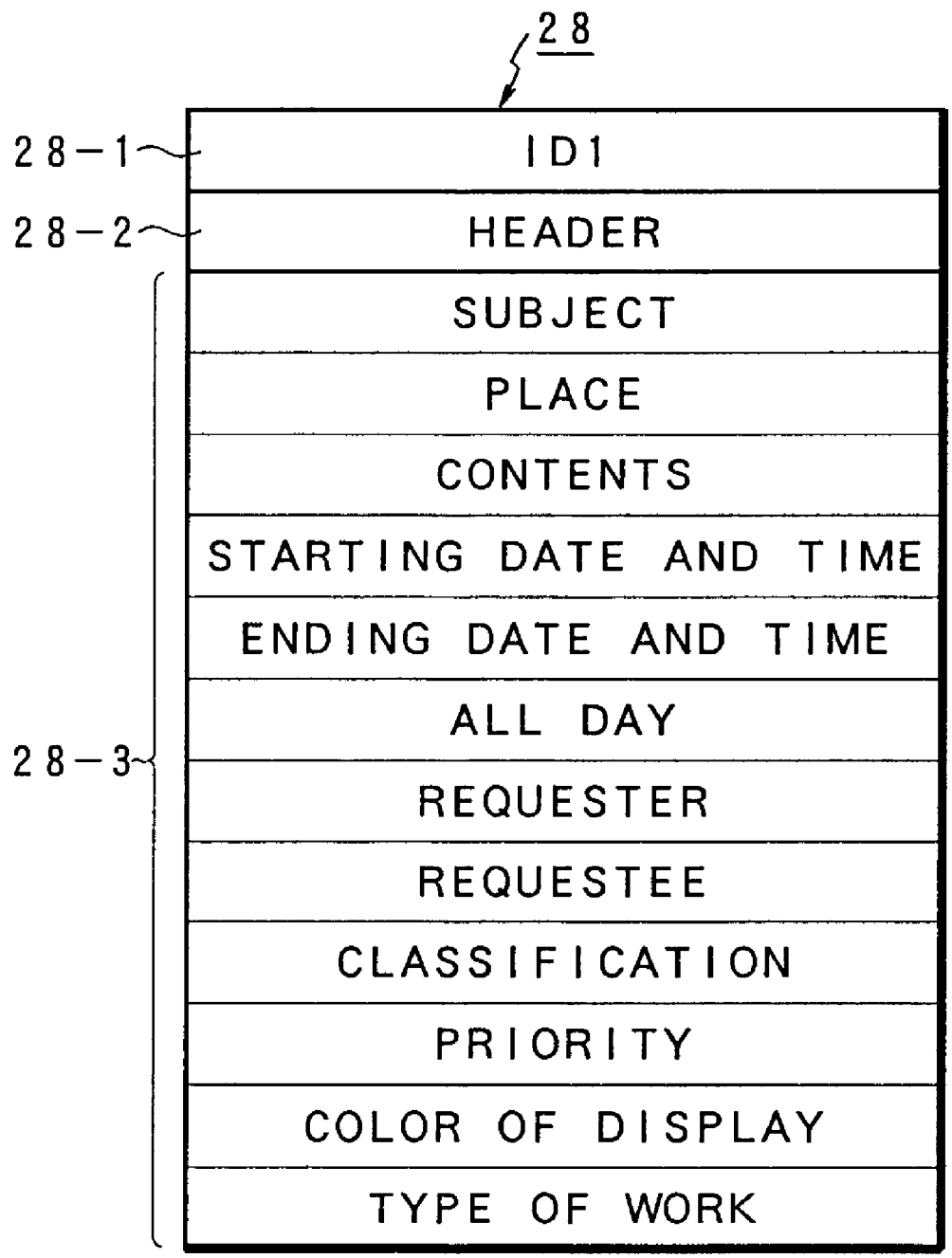
FIG. 5 is an explanatory diagram of a schedule list record of FIG. 2.

FIG. 5 is an explanatory diagram of the schedule list record 28 provided in the schedule list management unit 44 of FIG. 2. This schedule list record 28 includes a foremost ID field 28-1 recording ID1 indicative of the schedule list management unit 44 and a next header field 28-2 for recording header information. The header field 28-2 is followed by a data field 28-3 which allows in this example recording of twelve items, that is, subject, place, contents, starting date and time, ending date and time, all day, requester, requestee, classification, priority, color of display and type of work.

Figure 6:
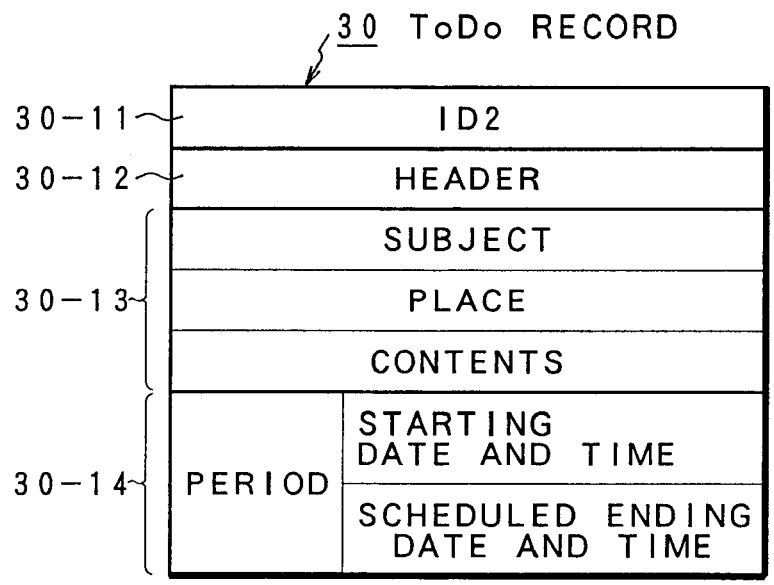
FIG. 6 is an explanatory diagram of a ToDo record of FIG. 2.

FIG. 6 illustrates an example of the ToDo record 30 provided in the ToDo management unit 45 of FIG. 2 and stores ToDo information for preparations for transactions. The ToDo record 30 includes a foremost ID field 30-11 storing ID2 indicative of the ToDo management unit 45 of FIG. 2 and a next header field 30-12 for storing header information. The header field 30-12 is followed by a data field 30-13 for storing subject, place and contents therein. A period management field 30-14 is then provided for recording starting data and scheduled ending date and time.

Figure 7:
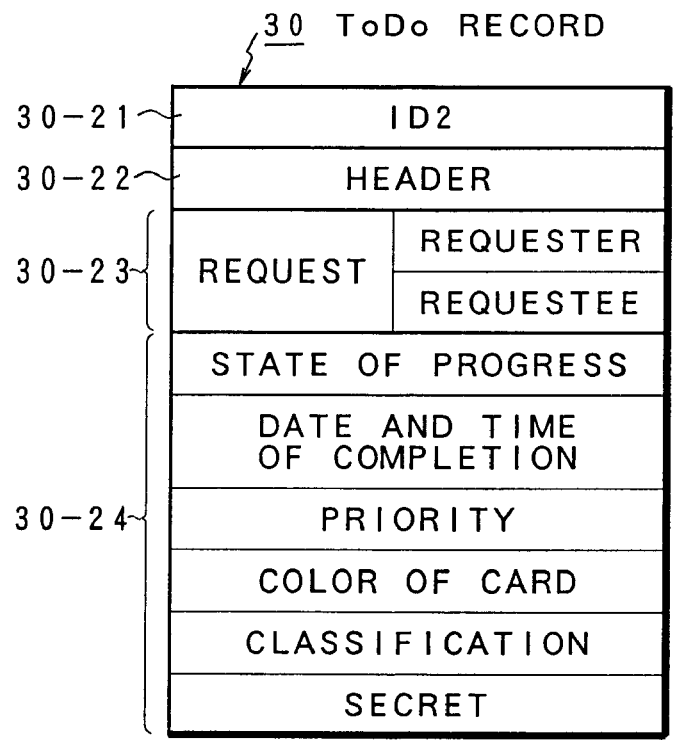
FIG. 7 is an explanatory diagram of another example of the ToDo record of FIG. 2.

FIG. 7 illustrates another example of the ToDo record 30 of FIG. 2, showing the ToDo record 30 for use in the state of progress of the requesting work. This ToDo record 30 includes a foremost ID field 30-21 recording ID2 indicative of the ToDo management unit 45 of FIG. 2 and then a header field 30-22 for recording header information. The header field 30-22 is followed by a request field 30-23 storing requester and requestee. A data field 30-24 is then provided for allowing therein the record of items including the state of progress of requesting work or the like, date of completion, priority, color of card, classification and secret.

Figure 8:
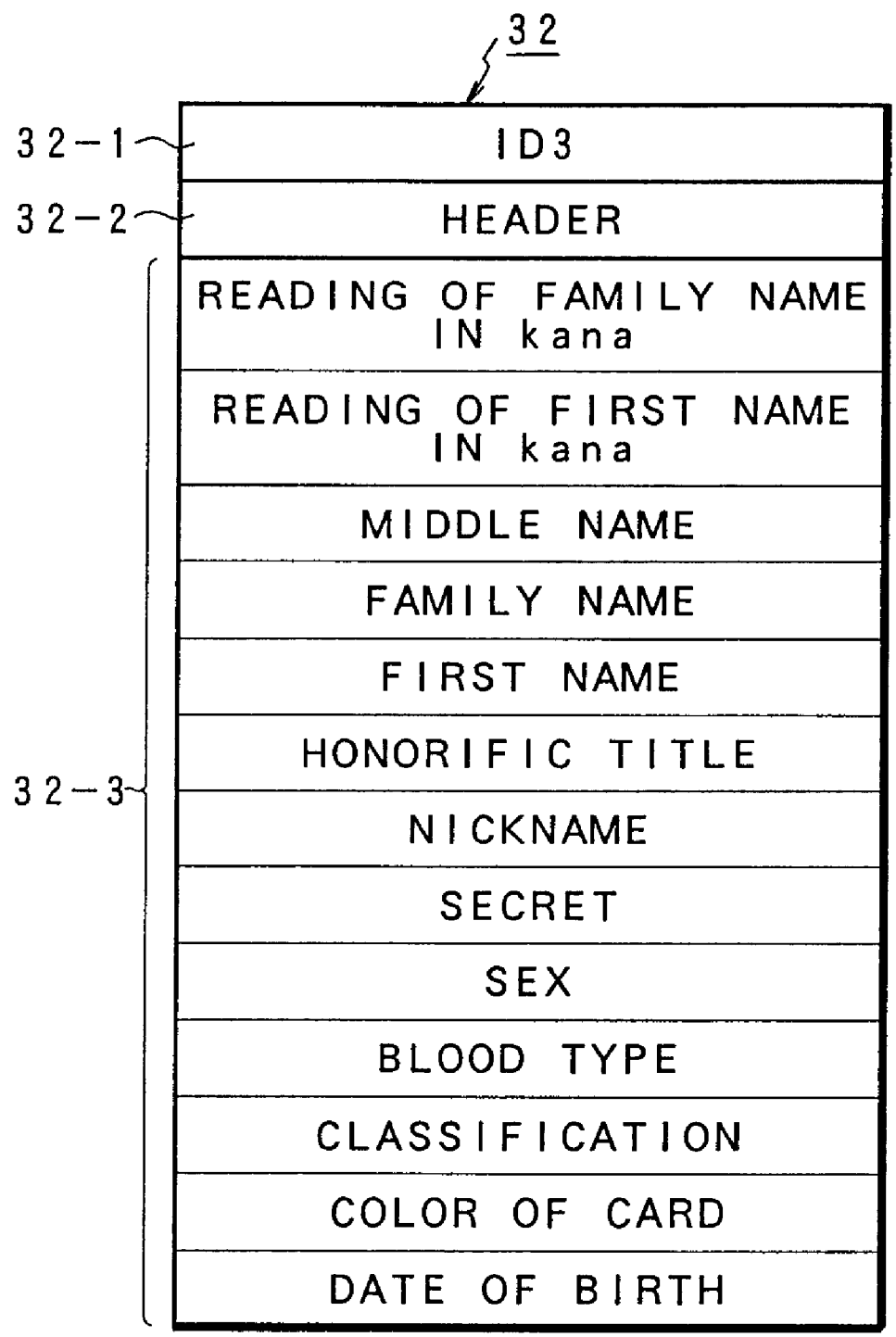
FIG. 8 is an explanatory diagram of an address book record of FIG. 2.

FIG. 8 is an explanatory diagram of the address book record 32 of FIG. 2. This address book record 32 includes a foremost ID field 32-1 recording ID3 indicative of the address book management unit 46 of FIG. 2 and then a header field 32-2 for recording header information. A data field 32-3 is then provided for allowing in this example the recording of items including the reading of family name in kana, reading of first name in kana, middle name, family name, first name, honorific title, nickname, secret, sex, blood type, classification, color of card and date of birth. The address book record 32 shown in FIG. 8 is recorded as a record of the secondary storage 16. In case the address book record 32 is read out as data to be processed and is recorded in the main storage 14, it is used for finding items including day of week, age, twelve constellations, thirteen constellations, ten calendar signs, twelve animal signs, from the date of birth in the address book record 32 and from a timer built in the information equipment.

Figure 9:
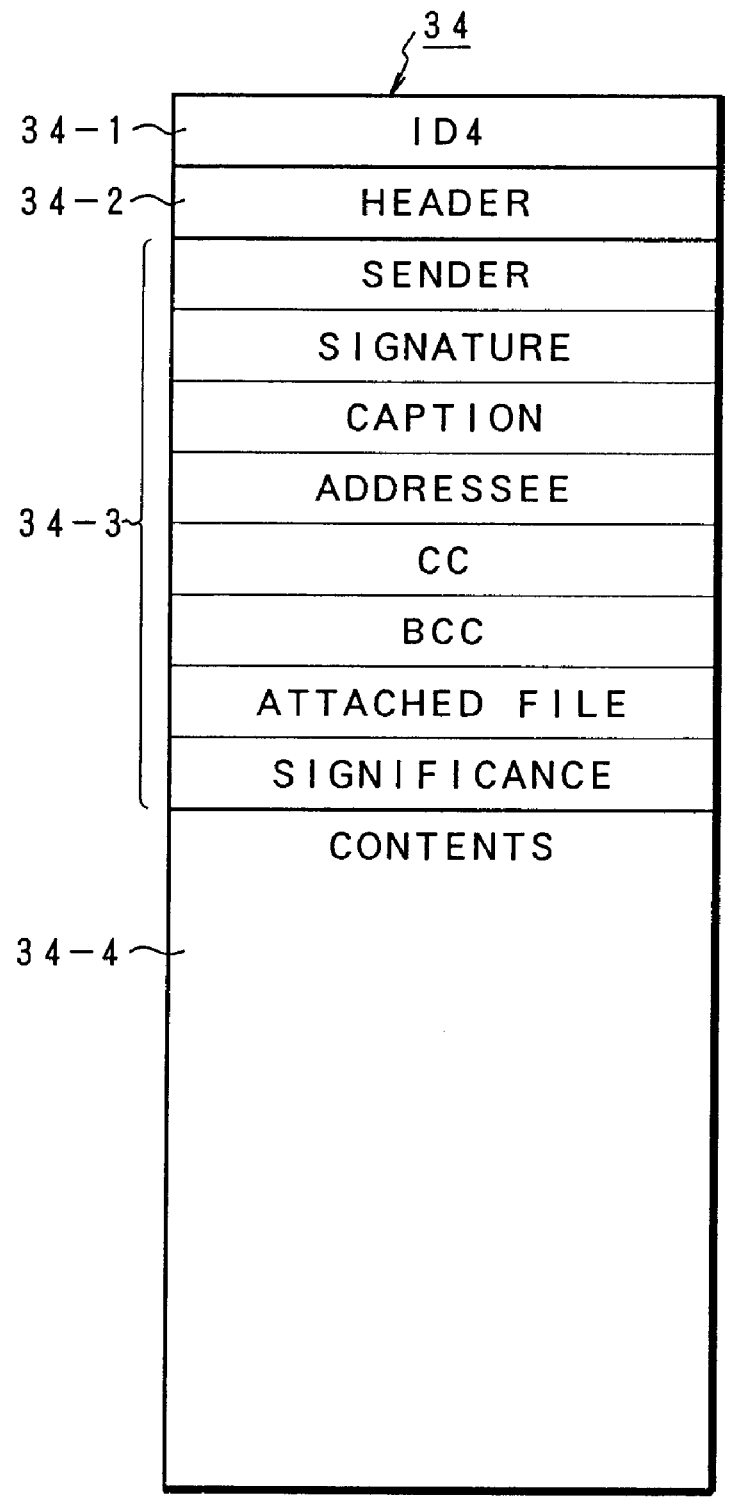
FIG. 9 is an explanatory diagram of a mail record of FIG. 2.

Furthermore, FIG. 9 is an explanatory diagram of the mail record 34 of FIG. 2. The mail record 34 includes a foremost ID field recording ID4 indicative of the mail management field 48 of FIG. 2 and a next header field 34-2 for storing header information. A data field 34-3 is then provided for allowing the recording of items required for the sending of mails, including sender, signature, caption, addressee (mail address), CC (mail address), BCC (mail address), attached file and significance. Contents field 34-4 is then provided for storing therein the contents constituting the body of mail.

Figure 10:
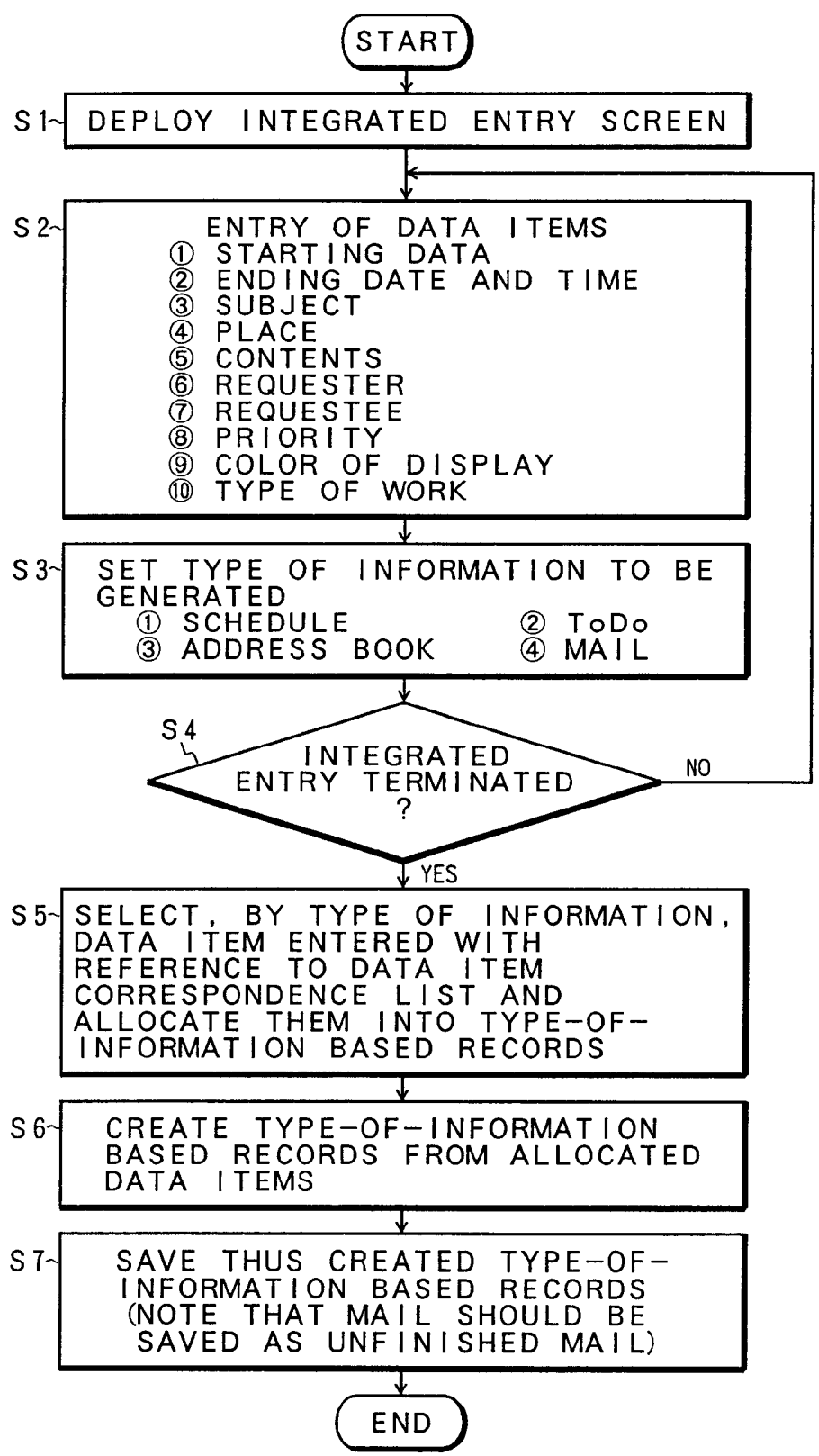
FIG. 10 is a flowchart of processing actions effected by the present invention.

FIG. 10 is a flowchart of the information management processing of the present invention in the function block of FIG. 2. When the information management apparatus of the present invention is activated and a new entry is specified, an integrated entry screen is deployed in step Si. This integrated entry screen is in the form of, e.g., an integrated entry screen 50 as shown in FIG. 11, which appears on the display unit.

The integrated entry screen 50 of FIG. 11 has on the first line entry frames for starting date and time 52 and ending date and time 54, which is followed by an entry frame for subject 56, an entry frame for place 58, and entry frame for contents 60. The entry frame for contents 60 is followed by entry frames for requester 62, requestee 64, priority 66, color of display 68 and type of work 70. Check boxes 72, 74, 76 and 78 are provided for four different information management functions for schedule, ToDo, address book and mail, which serve as information management functions for allocating data items entered through the integrated entry screen 50, whereby the user can select an information management function with which data for each management function is generated from the entered data.

At the right-hand bottom of the screen there are provided an OK button 80 for executing the processing on the basis of the thus integratedly entered data items and a cancel button 83 for specifying the cancellation of the processing. In this example of the integrated entry screen 50, the integrated entry for holding a meeting is specifically shown, with the starting date and time 52 being "1999/01/26, 11:00", and with the ending date and time 54 being "1999/ 01/26, 12:00". The subject 56 of the meeting is "business plan review meeting". Furthermore, entered as the place 58 to hold the meeting is "business division conference room". Entered as the contents 60 of the meeting are "99 business plan review meeting. Prepare ten copies of business planning draft of each division on that day". In this event, the requester 62 is "manager of business division" and the requestee 64 is "chief, Suzuki; and chief, Satoh". "Standard" is selected as the priority 68. Other than this, "urgent" could be set as the priority. The color of display 68 can appropriately be selected by the user as needed. The type of work 70 is for ToDo management and in this event is "creation of materials" Furthermore, provided as the type of information for generating data are four check boxes 72, 74, 76 and 78 for information management functions including schedule, ToDo, address book and mail.

Referring again to FIG. 10, when the integrated entry screen is deployed in step S1, data items necessary for holding a meeting for example are entered by use of the integrated entry screen 50 of FIG. 11 in step S2. With respect to the data items, as shown in step S3, setting of the type of information to be generated is performed by using the check boxes 72, 74, 76 and 78 on the integrated entry screen 50 of FIG. 11. Then, in step S4, a check is made to see if the integrated entry has been completed. If the OK button 80 is selected, it is judged that the integrated entry has been completed, allowing the procedure to go to step S5. In the step S5, the data selection unit 38 of FIG. 2 refers to the data item correspondence list 40 shown in FIG. 3 to select data items on the basis of the type of information including schedule list, ToDo, address book and mail from the thus entered data items, and allocates them to the records based on the information type. Then, in step S6, the data generation unit 42 of FIG. 2 records the data items allocated by the data selection unit 38, into the main storage 14, in the form of the records 28, 30, 32 and 34 of the schedule list management unit 44, the ToDo management unit 45, the address book management unit 45 and the mail management unit 48, respectively. Then, finally, in step S7, each record of the type of information is retained in the secondary storage 16 as in FIG. 1. Of the records which have been created from the recording of data items entered by use of the integrated entry unit 36, the schedule list record, in this event, the ToDo record 30 and the address book record 32 result in minimum indispensable information as the personal management information. However, the mail record 34 has no description of contents required for the sending for example, and hence it is retained in the secondary storage 16 as an unfinished mail in the process of creation. Afterward, in the same manner as in prior art, the mail management unit 48 is solely activated so that the thus retained unfinished mail is deployed on the display screen, to finish the mail record through the entry of the contents of the mail. FIGS. 12A and 12B are explanatory diagrams of a schedule list creation screen 84 obtained by deploying the schedule list record 28, which has been created on the basis of entry of data items through the integrated entry screen 50 of FIG. 11. This schedule list creation screen 84 includes subject 86, place 88, contents 90, start/ end check box 92, starting date 94, starting time 96, ending date 98, ending time 100, classification 102, requester 104, requestee 106, priority 108, color of display 110, event check box 111 and secret check box 112. The schedule list creation screen 84 further includes an OK button 114 which is selected when terminating the schedule list creation screen 84 while reflecting the contents of modification of each item and contents of updating, and a cancel button 116 which is selected when terminating the screen 84 without reflecting the contents of modification and the contents of updating. Thus, when entry of data items is performed through the integrated entry screen 50 in connection with the holding of the meeting as in FIG. 11, on the schedule list creation screen 84 of FIGS. 12A and 12B there automatically appear, based on the entry of data items through this integrated entry screen 50, "business plan review meeting" in the subject 86, "business division conference room" in the place 88, "'99 business plan review meeting/ Prepare ten copies of business planning draft of each division on that day" in the contents 92, "1999/01/26" in the starting date 94, "11:00" in the starting time 96, "1999/01/26" in the ending date 98, "12:00", in the ending time 100, "manage of business division" in the requester 104, "chief, Suzuki; chief, Satoh" in the requestee 106, "standard" in the priority 108, and a specified color of display in the color of display 110. In the cases where the schedule list record is created with either the starting date and time (date, time) or ending date and time (date, time) being entered through the integrated entry screen 50, the start/ end check box 92 is checked for display. In this manner, the data items related to the schedule list management entered through the integrated entry screen 50 are reflected as data items for a schedule tab. In order to enter more detailed schedule information, in the same manner as in the prior art, selection may be made of one of an alarm tab, a memo of result tub, an arbitrary item tub and a relational file tab so that a desired data entry or selection of items can be carried out.

FIG. 13 illustrates a ToDo setting screen 118 based on the ToDo record by the ToDo management unit 45, which has automatically been created through the entry of data items by use of the integrated entry screen 50 of FIG. 11. In this embodiment, the ToDo setting screen 136 of FIG. 14 is also created at the same time. On this ToDo setting screen 18 there appear, on the basis of the integrated entry screen 50, "creation of materials for business plan review meeting" in the subject 120, and "'99 business plan review meeting/ Prepare ten copies of business planing draft of each division on that day" in the contents 122, with the starting date 126 indicating "1999/01/14" and with the scheduled ending date 128 bearing "1999/01/25" corresponding to the previous day of the ending date "1999/01/26" on the integrated entry screen 50 of FIG. 12. For this scheduled ending date 128, the value of the day before the ending date on the integrated entry screen 50 may automatically be entered as a default, or alternatively the value may be entered by the user. Furthermore, "17:00" is set as the scheduled ending time, although it may also be entered as a default or may be entered by the user. A check box 131 is further provided which bears a sentence that "when expired, regard as passing of time limit". Furthermore, an OK button 132 and a cancel button 134 are disposed at the right-hand bottom of the screen.

FIG. 14 is an explanatory diagram of data items displayed by the detail tabs on the ToDo setting screen 118 of the ToDo record, which has automatically been created through the integrated entry for holding a meeting of FIG. 11, and in which setting and management of the state of progress for holding the meeting are carried out. The detail tubs on this ToDo setting screen 118 include a requester 138 indicating "manger of business division", a requestee 140 indicating "chief, Suzuki; chief, Satoh", a state of progress 142 indicating "unstarted" as the default for the state of progress, and a date of completion 144 indicating "none" as the default. A priority 146 indicates "standard" based on the integrated entry screen 50 and a color of card 148 indicates the color of display also specified on the integrated entry screen. Furthermore, a classification 150 and a secret check box 152 are provided as the entries peculiar to the detail tabs. An OK button 154 and a cancel button 156 are disposed at the right-hand bottom. In this manner, data items related to the ToDo management functions entered through the integrated entry screen 50 are reflected on data items of the standard tabs and the detail tabs on the ToDo setting screen 118. Furthermore, in order to enter more detailed ToDo information, selection may be made of any one of the alarm tab, the arbitrary item tab and the relational file tab on the ToDo setting screen 118 in the conventional manner, to perform desired data entries and item selections.

FIGS. 15A and 15B illustrate an address book creation screen 160 displaying an address book record, which has automatically been created on the basis of the integrated entry screen 50 of FIG. 11. In this embodiment, in response to the entry of data items through the integrated entry screen 50 of FIG. 11, the address book record is created from the data items of the requester and the requestee as shown in the data item correspondence list 40 of FIG. 3, with FIGS. 15A and 15B showing the address book creation screen indicating "chief, Suzuki" as the requestee. The "chief, Suzuki", one of the requestees is automatically set in a title 162, and entry frames of personal information about the address book are generated of "chief, Suzuki" based on the data entry through the integrated entry screen 50 for the title 162. Data items of the personal information tabs relating to the address book include reading of family name in kana 166, reading of first name in kana 168, middle name 170, family name 172, first name 174, honorific title 176, nickname 177, sex 180, blood type 182, secret check box 178, classification 184 and color of card 186. A date of birth check box 188 is provided in order to enable the year, month, day to be entered as the date of birth, allowing the display in the respective items of the day of week, age, twelve constellations, thirteen constellations, ten calendar signs and twelve animal signs, which have been found from the thus entered information and the internal timer. For this reason, if more detailed personal information is needed as the address book of the title 162, "chief, Suzuki" to be integratedly entered, the user can simply enter data required for data items of the personal information tab and the other tabs. Naturally, an execution key 210 and a cancel key 212 are provided at the right-hand bottom of the address book creation screen 160. Although not shown, the address book record is also created of another requestee, "chief, Satoh" in the same manner so that reference and updating can naturally be made using the address book creation screen 160.

FIG. 16 is an explanatory diagram of a mail sending screen 214 displaying the mail record 34 which has automatically been created from data items entered through the integrated entry screen 50 of FIG. 11. The mail sending screen 214 is a screen for creating a send mail, in which a caption 220 indicating "business plan review meeting" and an addressee 222 indicating "chief, Suzuki; chief Satoh" are automatically set by the entry of data items through the integrated entry screen 50 of FIG. 11. Furthermore, as to the addressees "chief, Suzuki; chief Satoh" data and time, subject, place and content in the contents 232, their character strings as well as the content of the mail are also automatically created from the entry data items on the integrated entry screen 50 of FIG. 11. As needed, the user performs the entry of a new sentence or modification of the content of the thus automatically-created mail. The user can enter and set, as needed, sender 216, signature 218, CC 224, BCC 226, attached file 228 and significance 230 other than the items automatically set on the basis of data entry through the integrated entry screen in the mail sending screen 214. Thus, in the mail sending screen 214, only some of items are automatically entered and registered from the entry of data items through the integrated entry screen 50 of FIG. 11, with the mail record based on the integrated entry being retained as an unfinished mail in the secondary storage. Accordingly, when it is actually desired to send a mail, read-out is made of an unfinished mail which is retained in the form of the unfinished mail and whose items have automatically been set by the integrated entry. Afterwards, unentered items and contents are entered to finish the mail for sending. In the case of a send mail whose content of the text is unnecessary, or in the case of the user considering the content of text to be unnecessary, the creation of the mail can be completed merely by entering and recording some of items on the mail sending screen 214, which have automatically been set by the entry of data items through the integrated entry screen 50 of FIG. 11. Furthermore, the integrated entry screen 50 may be provided with items for allowing entry of the content of text of the mail so that a complete mail can be created by merely entering data on the integrated entry screen 50. Also, when it is desired to alter arbitrary data items of the contents of the schedule list record, address book record, ToDo record and mail record, their respective screens may separately be invoked so that the user can update specific data items of each record by altering the corresponding data items.

The present invention further provides a record medium in which is stored an information management program executed by a computer. Embodiments of the computer readable record medium having the information management program recorded thereon can be for example a removable portable record medium such as a CD-RAM or a floppy disk, a storage device for program providers who provide programs via lines, or a memory device such as a RAM or a hard disk of the program installed processor. The information management program provided by the record medium is loaded into the processor to be run on its main storage.

According to the present invention as set forth hereinabove, of data necessary for the creation of information corresponding to a plurality of different management functions, common data are prepared as entry items so that when data are entered by use of the integrated entry unit, the data items are automatically selected for each of the management functions, after which data for each management function are generated. In case of holding a meeting, for example, where creation of a plurality of different types of information such as the schedule list, ToDo, mails may be required for a single event, there is no need to perform any individual entry for each of the management functions while switching to each management function for data entry, whereupon a simple creation of the information is ensured without any inconsistency and a highly convenient information management and operation can be achieved.

Although in the above embodiments the personal information has included by way of example four different type of information on schedule management, ToDo management, address book management and mail management, the automatic creation utilizing the integrated entry could be applied intactly to the other information management functions.

Although in the above embodiments description has been made of the personal information management by way of example, the present invention is not limited to this, but it is possible to apply it to the apparatus having a plurality of types of management functions, e.g., to the groupware to be utilized for the operations by a plurality of persons.

It will be appreciated that the present invention is not limited to the types of data items shown in the above preferred embodiments, and that it is possible to add or alter appropriate data items if necessary. It is further to be appreciated that the present invention is not limited to the above embodiments and that it covers appropriate variants insofar as it does not impair its objects and advantages.

What is claimed is:

1. An information managing apparatus which generates and manages necessary data by using entered data items, comprising:

a plurality of personal information management units for managing a plurality of different kinds of personal information;

an entry unit for entry of information by using a comprehensive entry screen providing a plurality of data item entry boxes for causing a user to enter information necessary for all or part of said personal information management units, and check boxes for causing the user to specify at least one of said personal information management units which generate data from data items entered into part or all of the entry boxes;

a data selection unit for selecting correspondence information previously defining a correspondence relationship between each of said personal information management units and the data items, and selecting at least one data item entered into the entry boxes based on a specification of said personal information management units derived from the check boxes; and a data generation unit for generating data for each of said personal information management units specified by said check boxes by using the data items selected by said data selection unit.

2. An apparatus according to claim 1, further comprising an entry screen display control unit for displaying on a display screen a single integrated entry screen for the entry of said data items.

3. An apparatus according to claim 1, wherein said data generation unit generates one data element of data for said personal information management units by use of the at least one data item.

4. An information managing method for generating and managing necessary data by using entered data items, said method comprising:

displaying a comprehensive entry screen including a plurality of data item entry boxes for entry of information required by all or part of a plurality of personal information management functions which manage different kinds of personal information, and check boxes corresponding to the personal information management functions;

specifying, using the check boxes in the comprehensive entry screen, at least one personal information management function to generate data from data items entered into the data item entry boxes;

selecting at least one of the data items entered into the data item entry boxes, based on correspondence information previously defining a correspondence relationship between each of the personal information management functions and the data items, and said specifying of the at least one personal information management function via the check boxes; and generating data for each of the personal information management functions specified using the check boxes by using the at least one of the data items selected.

5. A method according to claim 4, further comprising selecting a desired management function generating said data.

6. A method according to claim 4, wherein said generating generates the data for the personal information management functions in which each of the data items selected in said selecting is allocated to a corresponding data element.

7. A method according to claim 4, wherein said generating generates one data element of data for the personal information management functions by use of the at least one of the data items selected in said selecting.

8. A computer readable recording medium in which is stored an information management program for causing a computer to perform a method of generating and managing necessary data by using entered data items, comprising:

displaying a comprehensive entry screen including a plurality of data item entry boxes for entry of information required by all or part of a plurality of personal information management functions which manage different kinds of personal information, and check boxes corresponding to the personal information management functions;

specifying, using the check boxes in the comprehensive entry screen, at least one personal information management function to generate data from data items entered into the data item entry boxes;

selecting at least one of the data items entered into the data item entry boxes, based on correspondence information previously defining a correspondence relationship between each of the personal information management functions and the data items, and said specifying of the at least one personal information management function via the check boxes; and generating data for each of the personal information management functions specified using the check boxes by using the at least one of the data items selected.

9. A recording medium according to claim 8, wherein said method further comprises selecting a desired management function to use in said generating of the data.

10. A recording medium according to claim 8, wherein said generating generates one data element of data for the personal information management functions by use of the at least one of the data items selected.

* * * * *

UNITED STATES PATENT AND TRADEMARK OFFICE
CERTIFICATE OF CORRECTION

PATENT NO. : 6,707,471 B2 Page 1 of 1
DATED : March 16, 2004
INVENTOR(S) : Isao Funaki It is certified that error appears in the above-identified patent and that said Letters Patent is hereby corrected as shown below:

<u>Title page,</u>
Item [56], References Cited, U.S. PATENT DOCUMENTS, please add
-- 5,222,236    6/1993   Potash et al.
   5,640,577    7/1997   Scharmer --
FOREIGN PATENT DOCUMENTS, please add
-- EP 0580116 A2   1/1994
   GB 2328533 A    2/1999 --.

Signed and Sealed this

Sixth Day of July, 2004

JON W. DUDAS
*Acting Director of the United States Patent and Trademark Office*